March 13, 1945.　　　D. RAY　　　2,371,265
MACHINE FOR DECORATING BOTTLES
Filed Feb. 21, 1942　　11 Sheets-Sheet 1

INVENTOR.
DON RAY,
BY
ATTORNEY.

March 13, 1945.　　　D. RAY　　　2,371,265
MACHINE FOR DECORATING BOTTLES
Filed Feb. 21, 1942　　　11 Sheets-Sheet 3

INVENTOR.
DON RAY,
BY
ATTORNEY.

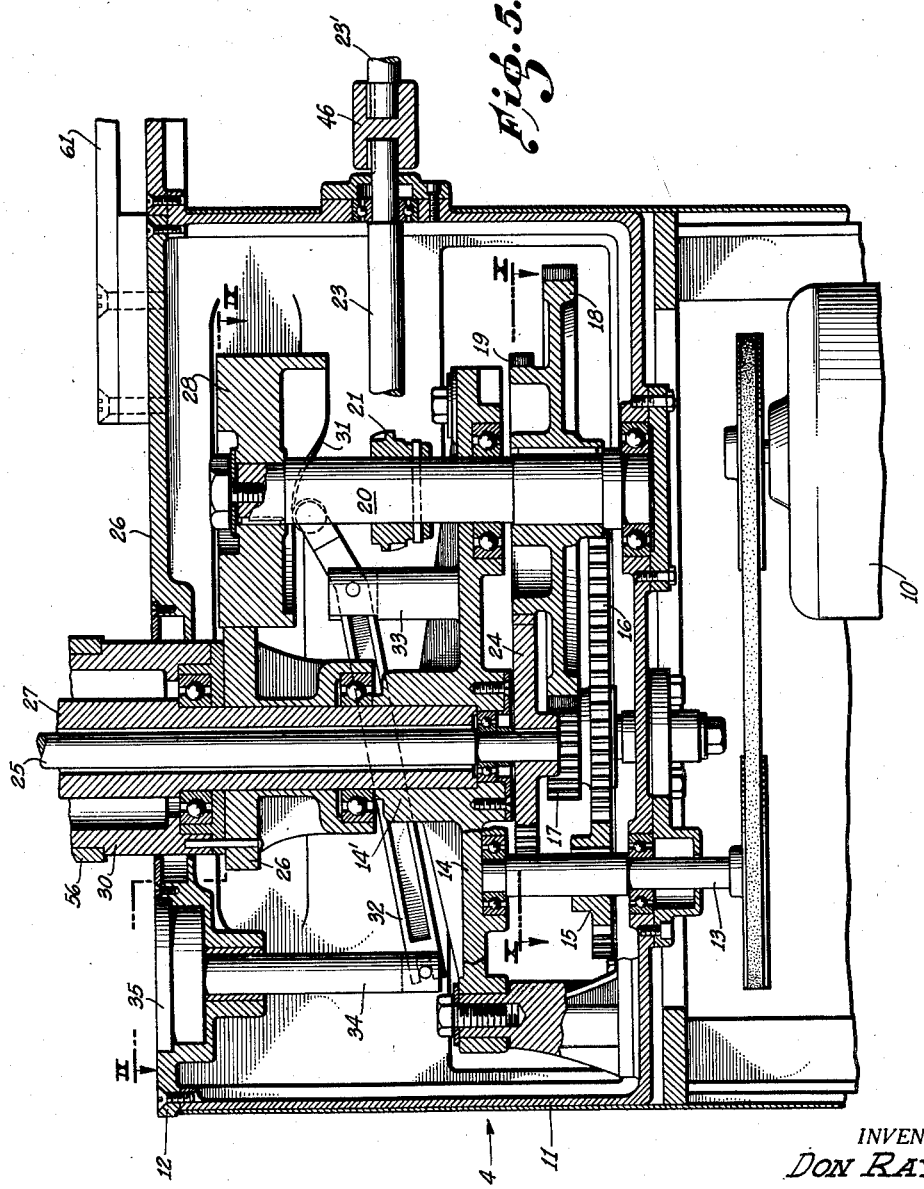

March 13, 1945. D. RAY 2,371,265
MACHINE FOR DECORATING BOTTLES
Filed Feb. 21, 1942 11 Sheets-Sheet 5
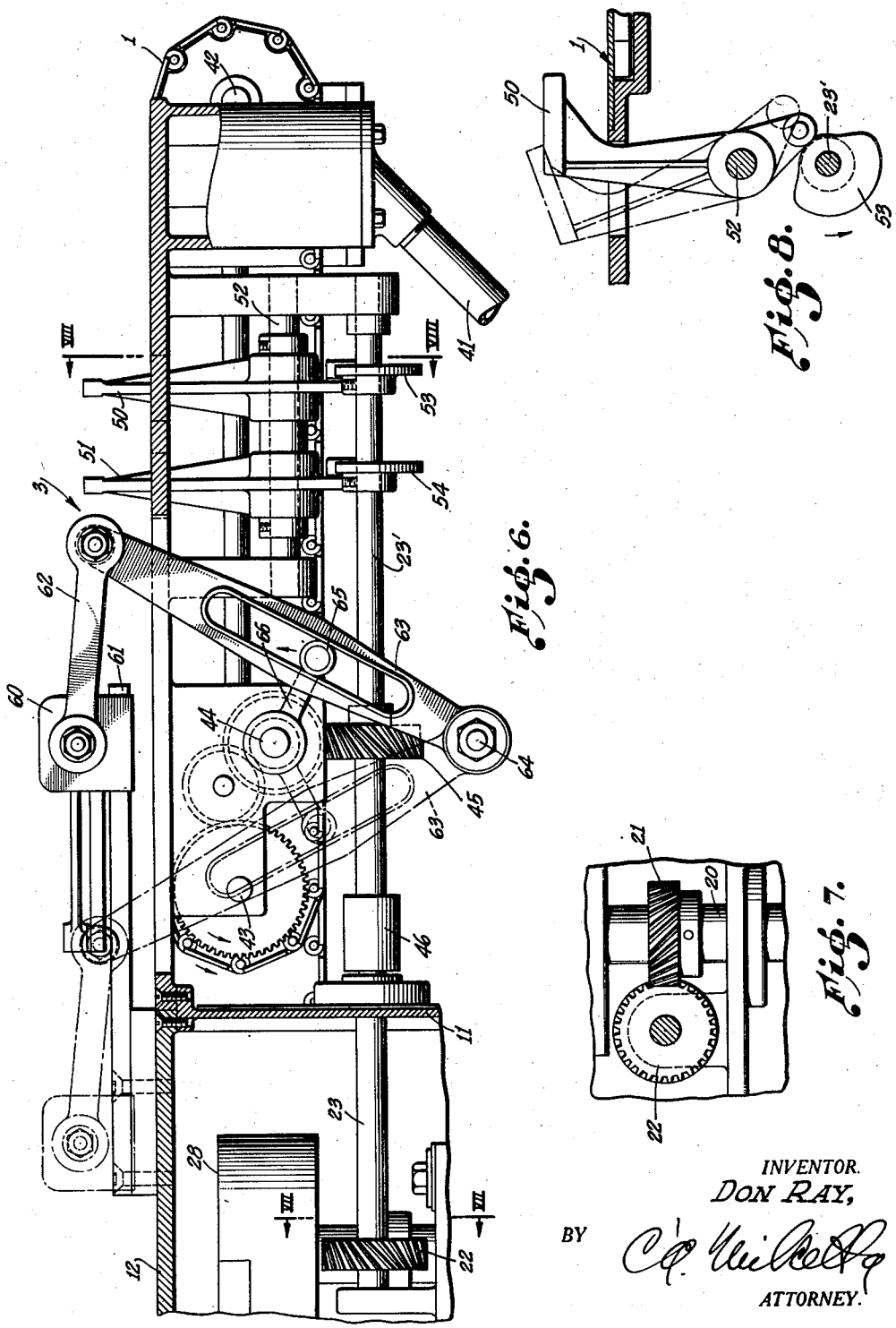
INVENTOR.
DON RAY,
BY
ATTORNEY.

March 13, 1945.　　　　　D. RAY　　　　　2,371,265
MACHINE FOR DECORATING BOTTLES
Filed Feb. 21, 1942　　　11 Sheets-Sheet 6

INVENTOR.
DON RAY,
BY
ATTORNEY.

March 13, 1945. D. RAY 2,371,265
MACHINE FOR DECORATING BOTTLES
Filed Feb. 21, 1942 11 Sheets-Sheet 7

INVENTOR.
DON RAY,
BY
ATTORNEY.

March 13, 1945. D. RAY 2,371,265
MACHINE FOR DECORATING BOTTLES
Filed Feb. 21, 1942 11 Sheets-Sheet 8

INVENTOR.
DON RAY,
BY
ATTORNEY.

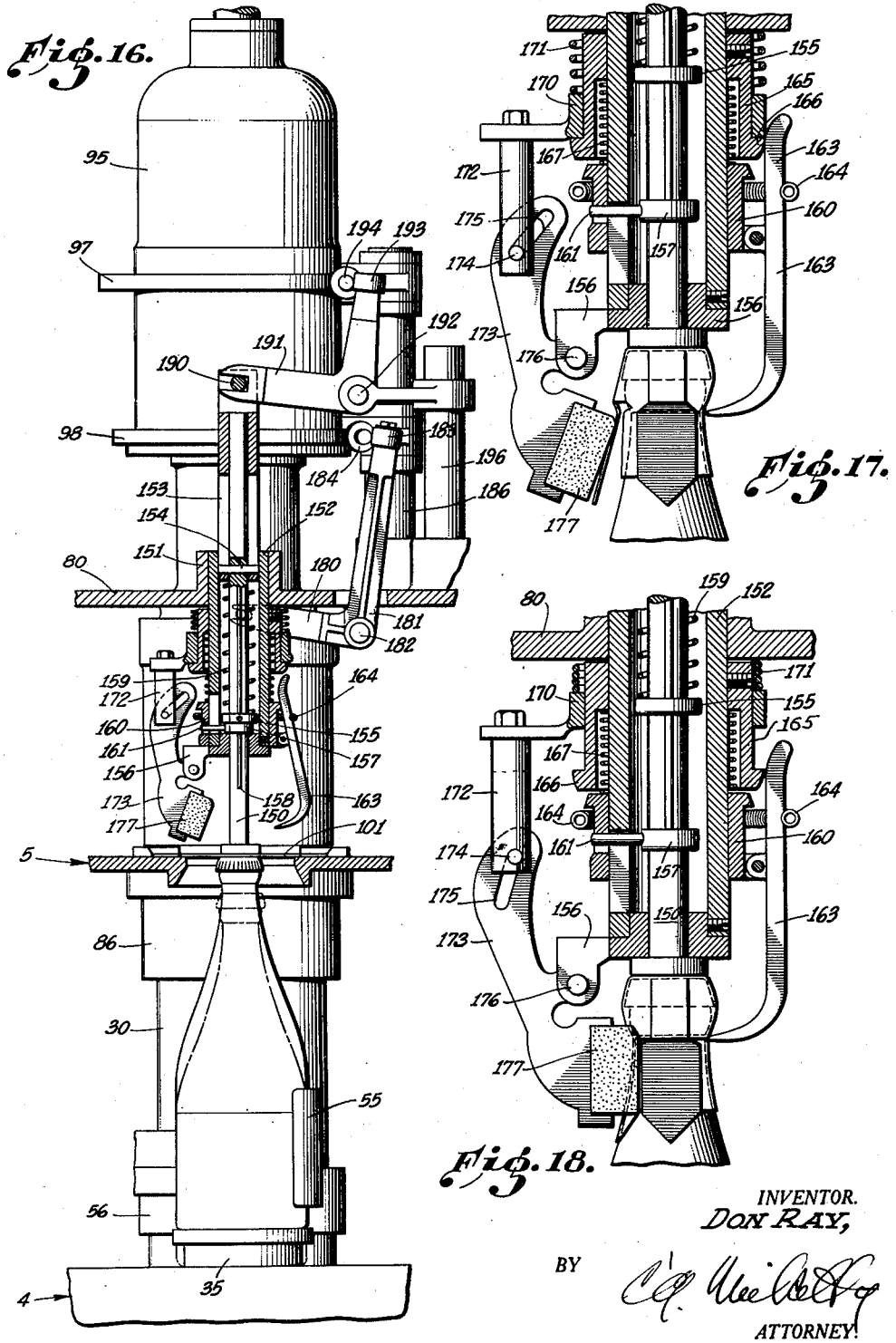

March 13, 1945. D. RAY 2,371,265
MACHINE FOR DECORATING BOTTLES
Filed Feb. 21, 1942 11 Sheets-Sheet 10

INVENTOR.
DON RAY,
BY
ATTORNEY.

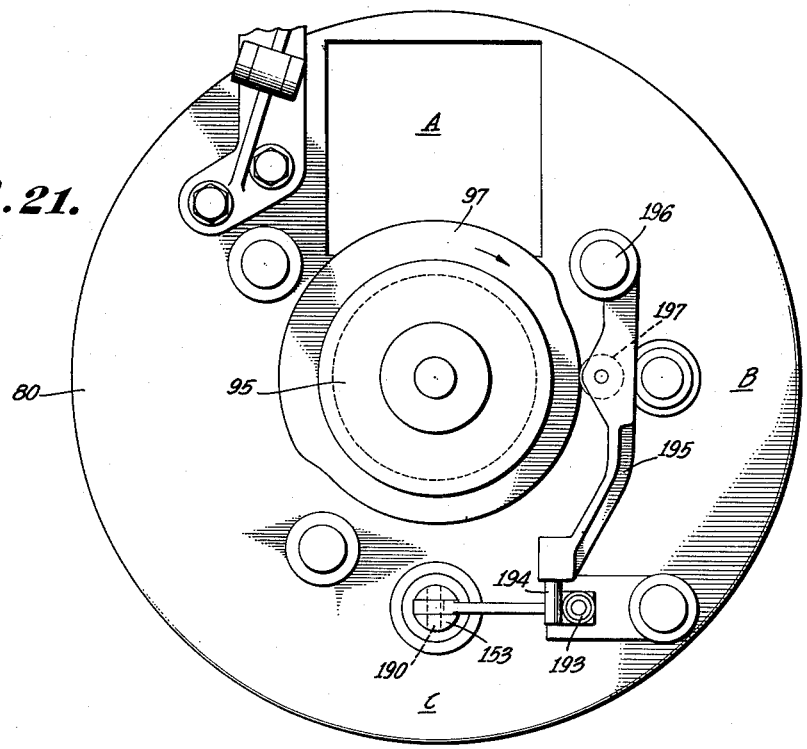
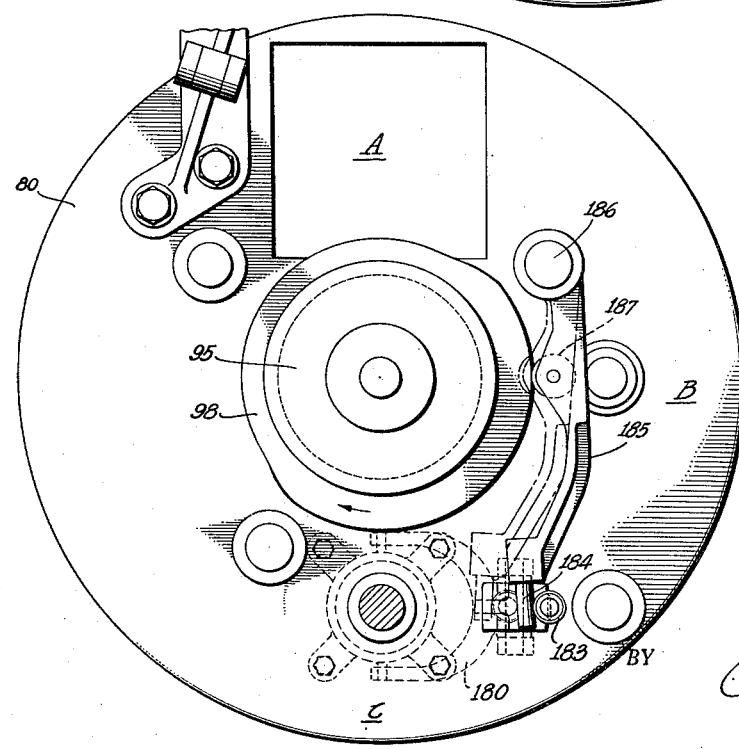

Patented Mar. 13, 1945

2,371,265

UNITED STATES PATENT OFFICE 2,371,265

MACHINE FOR DECORATING BOTTLES

Don Ray, Beverly Hills, Calif.

Application February 21, 1942, Serial No. 431,899

15 Claims. (Cl. 216—55)

This invention pertains to a machine for decorating various containers, such as bottles, jars and glasses, and is particularly directed toward an automatic machine capable of receiving bottles in a predetermined, timed, positive manner and in applying to the opening of the bottle a decorative seal. Particular reference will be had hereinafter to the use of the machine on bottles, such as beverage bottles, wine bottles and the like, but it is to be understood that the machine is also adapted for treating jars, glasses and other containers.

Heretofore machines have been designed for applying so-called hoods over the openings of bottle-like containers (see for example, Patent No. 1,170,598), but in most instances, the prior machines were cumbersome, bulky and incapable of handling a large number of containers within a unit of time. The present invention is directed toward a machine which is extremely compact, occupies very little floor space, and which includes means for positively feeding bottles thereinto in such manner that stalling of the machine and breakage of the bottles is obviated. Moreover, the machine is capable of receiving precut blanks and in applying the same over the opening and to the container in a rapid and effective manner without the use of tie wires, clips, staples or other devices.

The protection afforded to the contents of a container by a decorative seal of the character here contemplated depends somewhat upon the materials used in making the seal. The extent of protection to the contents is also influenced by the manner in which the bottle or container is actually sealed and the contents thereof. In most instances, the container is provided with a stopper, cork or other sealing medium, but in some instances the decorative seal applied by the present machine may include an integral sealing element which eliminates the necessity of subjecting the container to two separate operations, one for the application of a seal and the other for the operation of a decorative covering.

It is an object of the present invention therefore, to disclose a simple and effective mechanism whereby caps, decorative seals, hoods and the like may be quickly and positively attached over the opening of various containers.

A further object of the invention is to disclose and provide a capping machine including positive feeding means.

Other objects of the invention will become apparent to those skilled in the art from the following description of an exemplary form of the invention.

In order to facilitate understanding, reference will be had to the appended drawings in which:

Fig. 5 is an enlarged vertical section through the gear case.

Fig. 6 is an enlarged side elevation partly in section of the feeding and transfer device.

Fig. 7 is a vertical transverse section taken along the plane VII—VII of Fig. 6.

Fig. 8 is a transverse section taken along the plane VIII—VIII of Fig. 6.

Fig. 16 is a side elevation of the mechanism for applying the seal to a container.

Figs. 17 and 18 are enlarged views of the chuck at progressive stages of operation.

Figs. 21 and 22 are plan views of the control head identifying elements actuating the capping mechanism.

Figure 1:
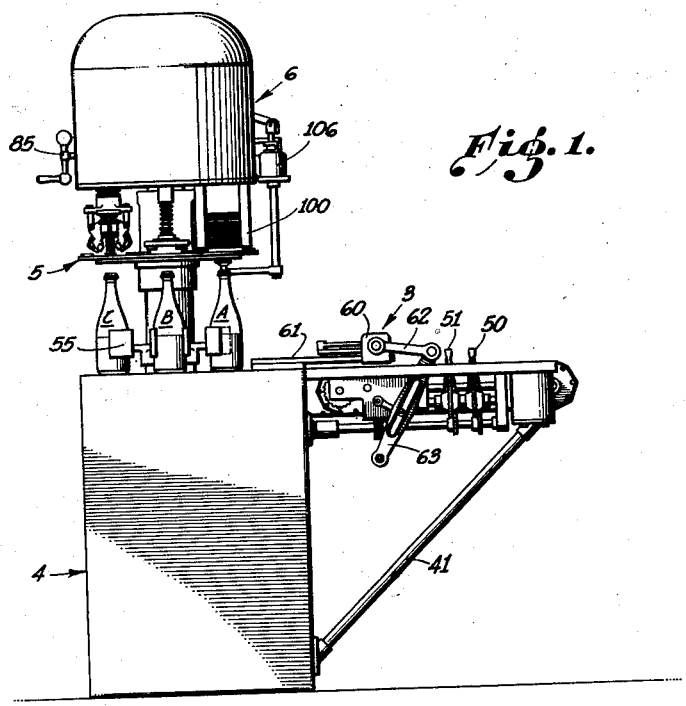
Fig. 1 is a side elevation of the entire machine.
Figure 2:
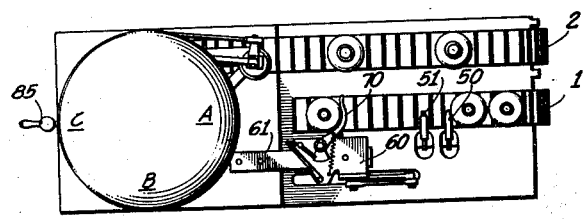
Fig. 2 is a plan view thereof.

Generally stated, the machine may be said to include feeding and discharge conveyors, generally indicated by 1 and 2, and a transfer device 3 for moving bottles from the feeding conveyor into the machine proper. The machine itself includes a base 4, an intermittently rotating work turret 5 and a control head 6. As shown in Figs. 1 and 2, most of the machine is suitably enclosed in removable hoods so as to facilitate cleaning and to adapt the machine for use under sanitary conditions. Fig. 2, moreover, shows the primary positions at which operations are carried out. For example, bottles are received by the machine at the point A and the decorative seals are placed upon the work turret 5 at this point. At position B the decorative seals are heated; at position C, the seals are actually applied to the bottle or other container.

*Driving mechanism*

The driving mechanism is contained within the base housing 4 and as best shown in Figs. 3, 4, 5, 9 and 10 may include the motor 10 positioned in the lower part of this housing. Suitable electrical controls for the motor may also be contained in this lower portion of the housing which may be provided with a door for ready accessibility. The upper portion of the base housing may comprise a casting 11 provided with a cover plate 12 having a smooth, machined, upper surface, this casting and its top forming a driving and gear box which may be filled with lubricant to facilitate quiet operation of the working parts.

The motor may drive a stub shaft 13, the upper end of said stub shaft being retained in bearings held by a sub-frame 14 within the casting 11. Power is transmitted from the stub shaft 13 by means of a pinion 15 to a large gear 16 which may be integral with a pinion 17. The pinion 17 engages the gear 18 having a pinion 19 integral therewith. The gears 18 and 19 are carried by a Geneva drive shaft 20 carrying a worm gear 21 in engagement with a spiral gear 22 mounted upon a counter-shaft 23 extending through the side wall of the casting 11 and housing 4. The counter-shaft 23 is used for driving the feeding devices.

The pinion 19 is in engagement with the gear 24 mounted upon the lower end of the shaft 25 extending vertically through the work turret and control head of the machine. This shaft 25 is continuously driven.

Figure 9:
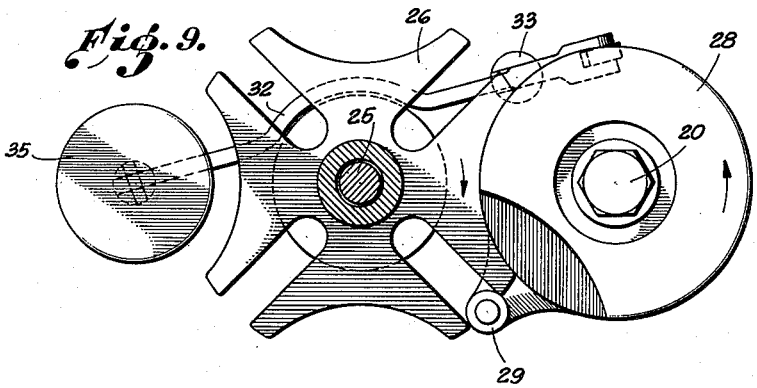
Fig. 9 is a horizontal section taken along the plane IX—IX of Fig. 5.
Figure 10:
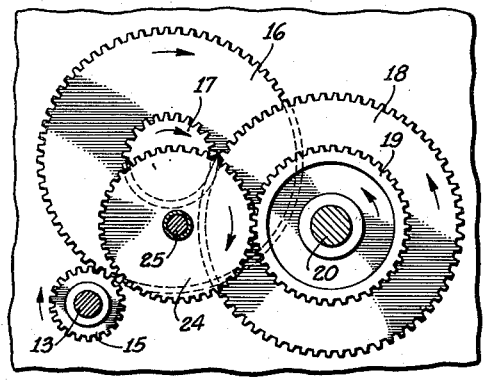
Fig. 10 is a horizontal section taken along the plane X—X of Fig. 5.

A Geneva gear 26 is supported for rotation upon a boss 14' extending from the sub-frame 14 and surrounds a fixed column 27 carried by the sub-frame 14. This Geneva gear 26 is actuated by the cam head 28 mounted upon the Geneva drive shaft 20. The actuating roller of the cam 28 is indicated at 29 (Fig. 9). The Geneva cam 26 is pinned or otherwise attached to the supporting column 30 which rotates intermittently.

It will be evident that the central, vertically extending assembly of the machine includes the intermittently rotating supporting column 30, a fixed column 27 positioned therein, and a continuously driven shaft 25 within the fixed column. These elements all extend above the top or work table 12.

Figure 3:
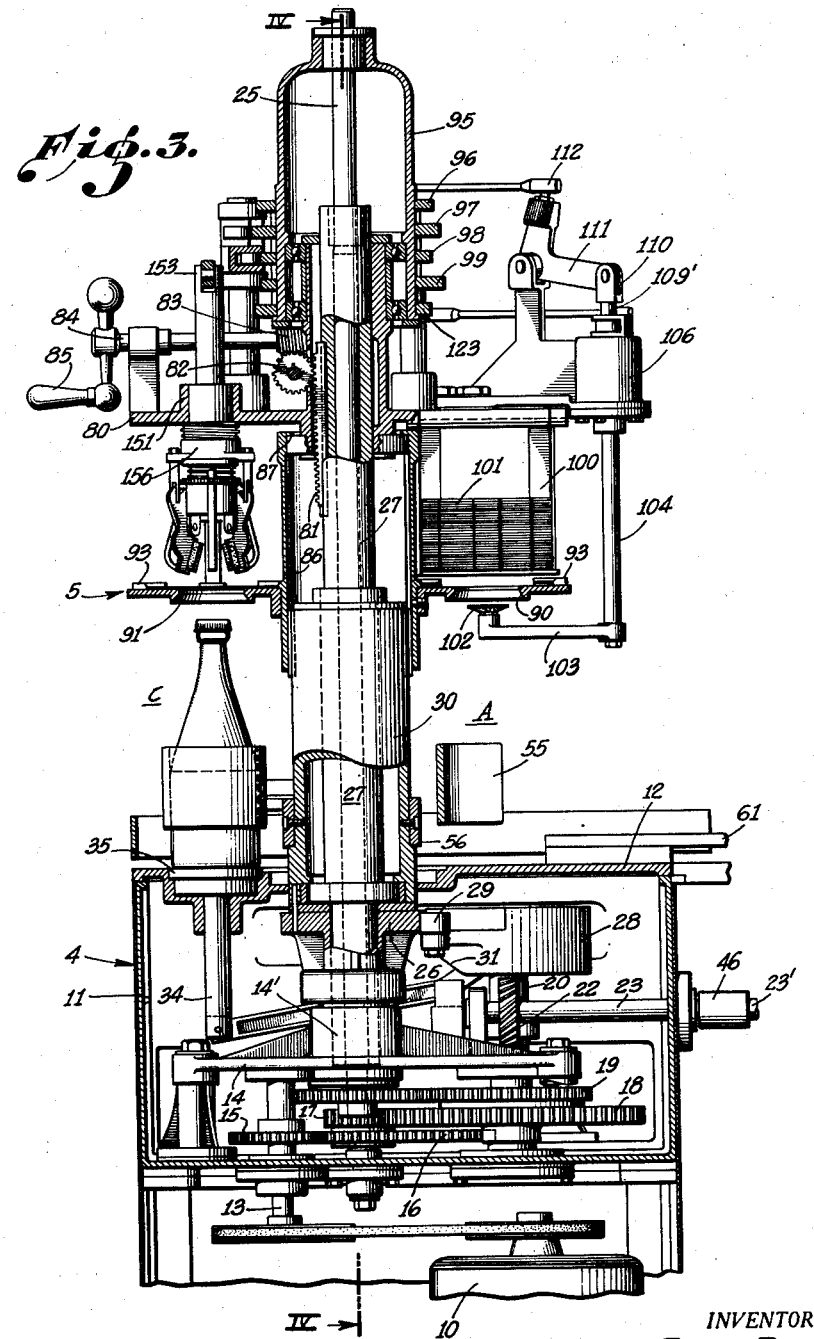
Fig. 3 is a vertical section, partly broken away, through the upper portion of the base housing, work turret and control head, with the upper enclosing cover removed.
Figure 4:
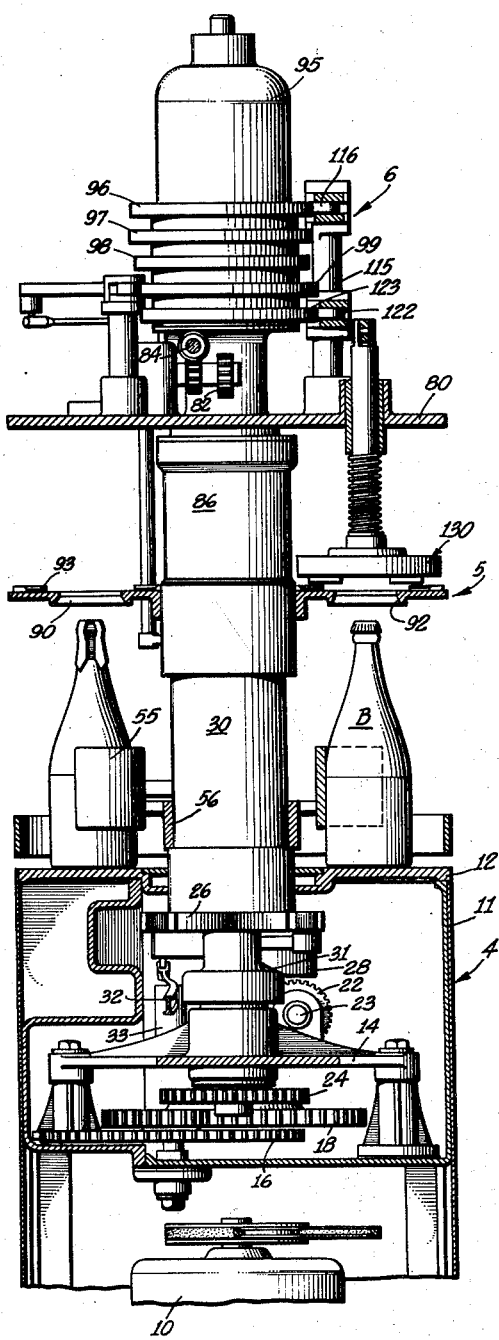
Fig. 4 is an enlarged vertical section taken transversely of the machine.

The cam head 28 is provided on its lower surface with a cam edge 31. A rocker arm 32 pivoted in a suitable bearing 33 carried by the sub-frame 14 is provided with a roller at one end adapted to ride on the cam edge 31. The other end of the rocker arm is bifurcated and engages pins carried by the lower end of the rod 34 attached to the riser platform 35 which is preferably capable of dropping into a recess formed in the work table 12 as shown in Fig. 3. This riser platform 35 is located at the position C of Fig. 2. It will be evident, therefore, that the cam head 28 not only controls the intermittent movement of the supporting column 30 but also controls the intermittent operation of the riser platform 35. Obviously, the speed of rotation of the continuously driven shaft 25 and of the counter-shaft 23 is perfectly timed with the intermittent rotation of the supporting column 30 since all of these members are driven from the single motor 10 by gearing described heretofore.

*Feeding and transfer devices*

By referring to Figs. 6, 7, 8 and 11 the operation of the feeding and transfer devices 1, 2 and 3 will be understood. Extending from one side of the base housing 4 is a framework supported by the diagonal leg 41 and having transverse shafts 42 and 43 carrying drive wheels driving the feeding conveyor 1. This feeding conveyor may be of any desired type. The drive shaft 43 may be driven by suitable gearing from a stub shaft 44 which is driven in turn by means of a spiral gear 45 carried by a counter-shaft 23' suitably connected to the counter-shaft 23 within the base housing 4 as, for example, by means of a coupling 46.

The drive shaft 43, by means of other gearing not shown, may also drive the discharge conveyor 2 in the opposite direction and in a manner well understood by those skilled in the art.

Two longitudinally spaced stop arms 50 and 51 extend from beneath the upper lay of the feeding conveyor 1, these stop arms being carried by levers pivoted as at 52. The lower ends of these levers are provided with rollers contacting the edges of cams 53 and 54 respectively, the cams being mounted upon the counter-shaft 23'. Springs may be provided for urging the stop arms into the position shown in Fig. 11.

It will be understood that the linear speed of the feeding conveyor 1 is slightly in excess of the speed of bottles around the work table 12. The stop arms are automatically timed by the cams 53 and 54 so as to liberate bottles in precise timed relation with the speed of the machine.

Figure 11:
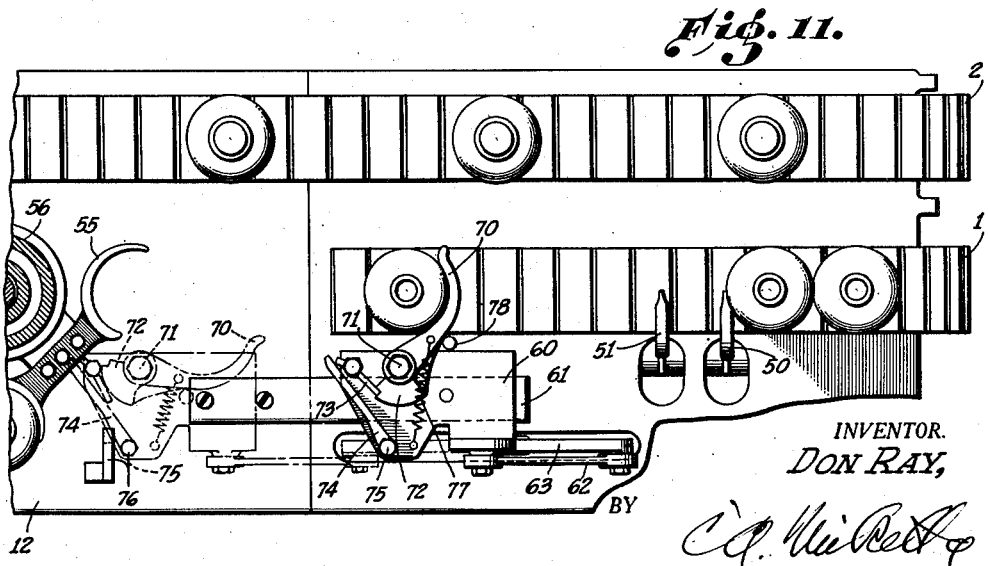
Fig. 11 is a plan view of a portion of the feeding and transfer device and the conveyors associated therewith.

The conveyor 1 terminates short of the work table 12 as best seen in Fig. 11 and a transfer mechanism, generally indicated by the numeral 3, is provided for positively feeding bottles onto the work table and into a desired holding arm, such as the arm 55 carried by a sleeve 56 attached to the supporting column 30. Such transfer device may include a reciprocating head 60 slidable alongside the conveyor 1 upon a guide rail 61. Reciprocating motion is imparted to the head 60 by means of a pivoted link 62 and a slotted link 63 pivoted at its lower end to a fixed pin 64. The slot link 63 receives a roller 65 carried by one end of an arm 66 mounted upon the stub shaft 44.

Fig. 6 illustrates the transfer mechanism in two extreme positions and it will be noted that when the shaft 44 is rotated in the direction of the arrow, the reciprocating head 60 will move from the feeding conveyor toward the main body of the machine at a varying rate but it will return at a much more rapid rate.

The reciprocating head 60 is provided with a smoothly curved transfer arm 70 pivoted to the head 60 at 71 and provided with a rearwardly extending latching boss 72 adapted to engage a pivoted latch dog 73. The head also carries a trip arm 74 pivoted at 75.

When the entire reciprocating head is at its dotted position (Fig. 11) the trip arm 74 engages the fixed stop 76 and releases the latch dog 73 from its engagement with the latch boss 72. The spring 77 pulls the transfer arm into a retracted position, shown in dotted lines. When the reciprocating head 60 moves back into its original position, the transfer arm engages a fixed pin 78 and again locks in extended position, the latch dog 73 being urged into latching position by a spring (not shown).

It will be evident, therefore, that supply of bottles to the machine is automatically assured, the two stop arms 50 and 51 operating intermittently so as to permit only one bottle to pass at a time. The transfer arm 70 extends in back of a bottle and then moves forward to transfer the bottle from the feeding conveyor 1 onto the work table 12 and into the holding arm 55 and in such transferring movement picks up speed gradually instead of suddenly and delivers the bottle at a decreased velocity so as to prevent breakage of the bottle against the holding arm. Positive feeding is assured by the device herein described.

Control head

As previously stated, the central supporting column 30 is rotated intermittently and carries bottles around the work table by means of the holding arms 55. Within the supporting column 30 is the stationary or fixed column 27 (Fig. 3). Slidably mounted thereon is the control deck 80. A rack gear 81 is held along one side of the fixed column 27 and engages a pinion gear 82 which may be rotated by means of a worm 83 carried by the shaft 84 provided with the actuating handle 85. It will be evident that rotation of the actuating handle 85 will cause the control deck 80 to rise and fall.

The control deck 80 is provided with a central bore extending through a downwardly extending boss provided with an outwardly extending flanged portion capable of being received by a sleeve 86 provided with an inwardly extending lip 87. The sleeve 86 is keyed to the intermittently rotating supporting column 30 for intermittent rotation therewith. By reason of cooperation between the lip 87, however, and the downwardly and outwardly extending flanged portion of the control deck 80, the sleeve 86 as well as the control deck 80 may be caused to rise and fall by actuating the handle 85.

Adjustably held by the sleeve 86 is the work turret 5 provided with a plurality of openings 90, 91, 92, etc., equal in number to the number of holding arms 55, so that one of said openings is immediately above each of the holding arms. Each of the openings 90, 91, etc., is provided with centering bosses 93 whereby the decorative seals may be properly positioned and held across the openings 90, 91, etc.

Above the control deck 80 is the control head and cam holder 95 which is continuously driven by the central shaft 25, the lower portion of the control head 95 being suitably journaled around the stationary upwardly extending portion of the control deck 80. Control cams 96, 97, 98 and 99 are carried by this control head 95 and the various operations of feeding decorative seals onto the work turret 5, heating the same and applying the same to the bottles are controlled and actuated by this head. Each of the various operations which takes place at the stations A, B, C, previously mentioned, may now be described.

Seal feeder

Figures 12, 13:
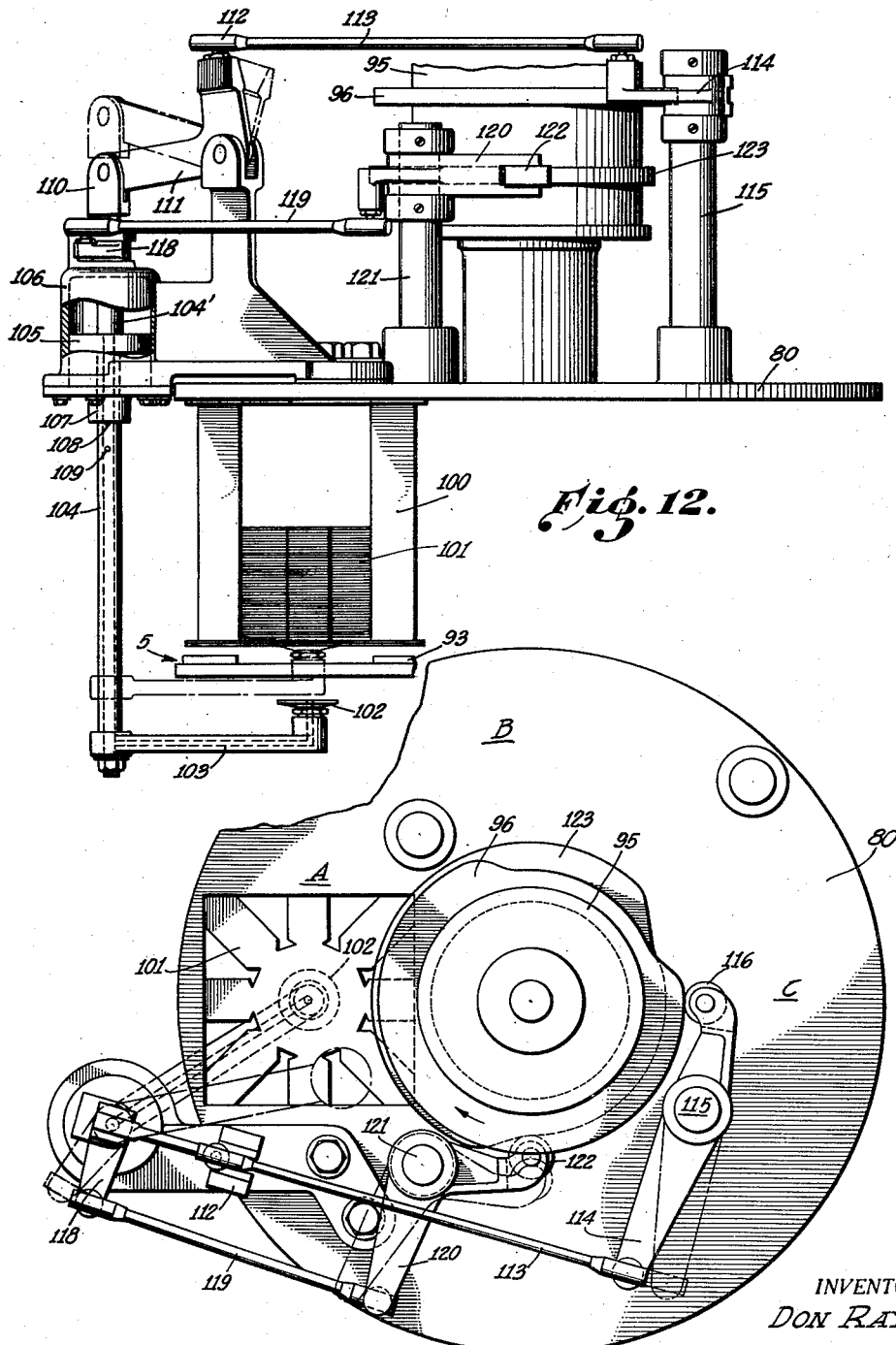
Fig. 12 is a side elevation of the seal feeder.
Fig. 13 is a plan view thereof.

By referring to Figs. 3, 12 and 13, it will be seen that a framework 100 adapted to receive a stack of precut seals 101 is suspended from the bottom of the control deck 80. The plan of a precut seal found satisfactory for use on wine and other beverage bottles is shown in Fig. 13. The bottom of the frame 1 is provided with a slight inwardly extending lip designed to prevent the free fall of the seals, this bottom being sufficiently open to permit the withdrawal of seals therefrom by means of a suction cup 102 carried by a hollow arm 103 extending from the bottom of a tube 104. The tube 104 carries a piston 105 at its upper end, such piston being positioned within a cylinder 106 carried by the control deck 80, the tube 104 extending through a suitable gland 107. The tube 104 is provided with two apertures 108 and 109 in communication with the conduit therein having its outlet in the center of the suction cup 102.

The piston 105 is then connected to a rod 104' which extends from the upper end of the cylinder 106 and is connected by a yoke 110 to a bell crank lever 111 pivoted in a suitable bracket carried by the control deck 80, the opposite end of the bell crank lever 111 being connected by a ball and socket swivel joint, generally indicated at 112, to an actuating rod 113 connected to a cam follower 114 pivoted as at 115 and having the roller 116 in contact with the cam 96 mounted upon the control head and cam holder 95.

It will be evident that rotation of the cam holder 95 will cause the cam follower 114 to follow the contours of cam 96, reciprocate the rod 113 and cause the bell crank lever 111 to raise and lower rod 104' and tube 104, this vertical reciprocating movement causing the suction cup to move through the aperture 90 of the work turret 5 substantially against the bottom of the stack of seals 101 within the frame 100 and then back through the aperture 90 of the work turret 5 to a position below such work turret 5, depositing one of the seals within the areas delineated by the centering bosses 93 around such aperture. In addition, the suction arm 103 and tube 104 are partly rotated so as to swing the arm 103 out of the way of an incoming bottle. This pivoting movement is accomplished by means of an arm 118 attached to the rod 104', the end of the arm 118 being connected by means of a ball and socket swivel joint to a rod 119, this rod being actuated by a bell crank lever 120 pivoted at 121 and having a roller or other cam follower 122 in contact with the cam 123 mounted upon the cam holder 95.

It will be evident from the description given that means have been provided whereby a decorative seal may be periodically deposited upon the work turret 5, the seal supplying mechanism swinging out of position in timed relation to the movement of bottles upon the work table of the machine.

Heater

Figure 14:
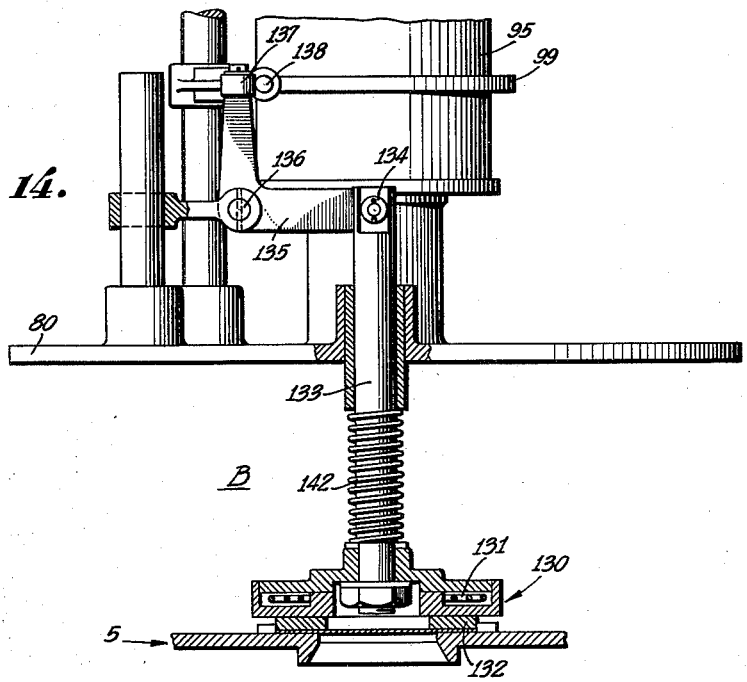
Fig. 14 is a side elevation of a portion of the heating means.
Figure 15:
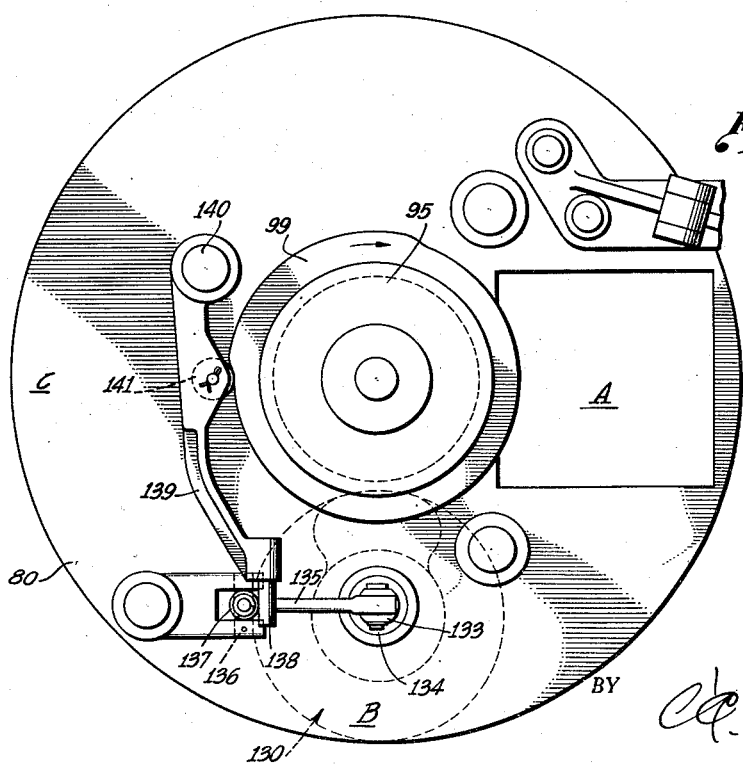
Fig. 15 is a plan view thereof.
Figure 19:
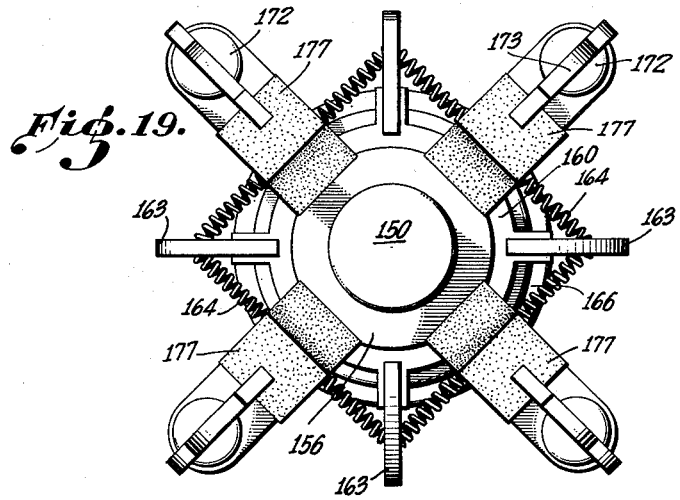
Figs. 19 and 20 are upwardly directed horizontal sections through a neck of a bottle at different stages of chuck action.
Figure 20:
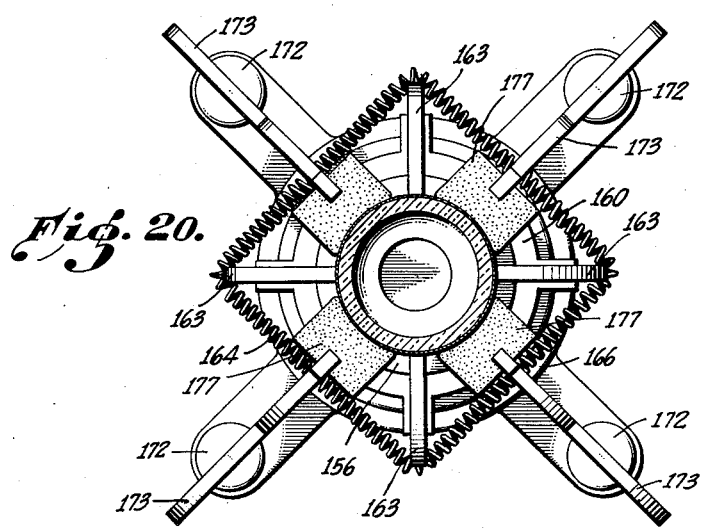

The seal supplying operation described hereinabove is performed in zone A. The supporting column 30, together with its related work turret 5, is rotated and places the opening 90, with a decorative seal positioned therein, in zone B. Immediately above zone B the control deck 80 carries a vertically reciprocable heater 130 carrying suitable heating coils 131 and downwardly extending spaced heat-directing bosses 132 adapted to localize the application of heat only to desired areas of a seal (see Figs. 14 and 15). This heater 130 is mounted on the lower end of a reciprocating rod 133, the upper end of said rod being pivotally connected as at 134 to a bell crank lever 135 pivoted at 136 and provided with an anti-friction or roller end 137 bearing against a pin 138 carried by a cam follower 139 pivoted at 140 and carrying a dog or roller 141 bearing against cam 99. A spring 142 maintains the entire assembly in proper mechanical contact and may be positioned between the control deck 80 and the heater 130. It will be evident that rotation of the control head 95 and cam 99 carried thereby will vertically and in timed precise relation raise and lower the heater 130 into heating contact with a seal carried by the work turret 5.

Sealing head and chuck

The arms 55 then carry the bottle, jar or other container onto the riser 35 (Fig. 3) which is immediately beneath the position C indicated in Fig. 2. A preheated decorative seal 101 (preheated by the heating element 130) is now in position above the bottle. The riser 35 moves the bottle upwardly under the influence of the lever 32 and cam face 31 within the base housing 4. The top of the bottle contacts the lower surface of the seal 101 and simultaneously the holding plunger is lowered to hold the seal against the top of the bottle. This initial position of the elements is best shown in Fig. 16, the holding plunger being indicated at 150. It will be seen that the control deck 80, which is fixed, is provided with a ported boss 151 through which the guiding sleeve 152 extends. Slidably extending into the guiding sleeve 152 is a slotted sleeve 153. The upper end of holding plunger 150 extends into this sleeve 153 and a pin 154 carried by the upper end of the plunger 150 slides within the slots of sleeve 153. A collar 155 longitudinally adjustable along the plunger 150 is carried thereby within the guide 152. The end of the guide 152 carries a spider 156. Between such spider and the adjustable collar 155 is a longitudinally movable element 157 having a key adapted to engage the longitudinal keyway terminating at 158. A spring 159 positioned within the guide 152 bears against the adjustable collar 155 and against the lower portion of the slotted sleeve 153, normally maintaining the parts in the position indicated in Fig. 16.

Vertically slidable upon the guide 152 is a sleeve 160. Movement of the movable element 157 may be transmitted to the sleeve 160 by means of a pin 161 extending through a slot in the guide 152. The sleeve 160 carries a plurality of pivoted fingers 163, said fingers extending downwardly beneath the spider 156 and being provided at the lower ends with inwardly extending tips. The upper ends of the fingers 163 are outwardly curved and are normally inwardly urged by means of an encircling spring 164.

Adjustably held upon the fixed guiding sleeve 152 is a stop member 165, provided with an outwardly extending lower flange 166. A spring 167 surrounds the fixed guide 152 and normally holds the sleeve 160 in lowermost position.

An actuating spider 170 is slidable upon the stop member 165 and is yieldably urged downwardly by means of a spring 171. The actuating spider 170 is provided with four downwardly extending arms 172 having bifurcated lower ends pinned onto chuck arms 173, the pins 174 extending through slots 175 in such chuck arms. The chuck arms are pivotally connected as at 176 to the stationary spider 156. The lower ends of the chuck arms 173 carry resilient pressure pads 177.

The actuating spider 170 is provided with trunnions which are engaged by means of a yoke 180 formed in a bell crank lever 181 pivoted as at 182 and extending through an aperture in the fixed control deck 80, the upper end of the bell crank lever being provided with a roller 183. The roller 183 bears against a stud 184 carried by means of a cam follower 185 pivoted at 186 and having the roller 187 in contact with cam 98. It will be evident therefore, that the cam 98 controls the operations of the chuck arms 173, upward movement of the bifurcated yoke 180 in the inclined slots 175 of the chuck arms causing the chuck arms to pivot at 177 and press the yielding pressure pads against the neck of the bottle.

The slotted sleeve 153 has a bifurcated upper end provided with a pin 190 which is engaged by the slotted end of a bell crank lever 191 pivoted at 192, the upper end of such bell crank lever being provided with a roller 193 bearing against the pin 194 in the end of cam follower 195 pivoted at 196 and provided with a roller 197 in contact with the edge of cam 97. Rotation of cam 97 will therefore cause the bell crank lever 191 to be actuated to raise or lower the slotted sleeve 153. It is the lowering of this sleeve 153 which depresses the plunger 150 into contact with the seal 101 at the instant the bottle touches the lower surface of such seal (Fig. 16).

The bottle then continues to rise, moving the plunger 150 upwardly, the pin 154 moving in the slot 153. The upward movement of the plunger 152 then causes the movable element 157 to engage the bottom of the keyway 158 and to also move upwardly. Upward movement of the element 157 is translated into an upward movement of the sleeve 160 carrying fingers 163, the upper ends of the fingers engaging the lower flange 166 of the stop member 165 and causing such fingers to move inwardly into the position indicated in Fig. 17. The fingers 163 initiate the folding operation of the decorative seal around the lip at the opening of the bottle.

The cam 98 then actuates cam follower 185 and bell crank lever 181, forcing the actuating spider 170 upwardly against the action of spring 171. Upward movement of the actuating spider 170 causes the chuck arms 173 to press the pressure pads against the neck of the bottle, this last movement causing the preheated thermoplastic areas of the decorative seal to bond to the overlying folded portions of the seal and form a completed protective and decorative cap upon the bottle over its opening and contiguous thereto. This final step is indicated in Fig. 18.

After the chuck arms are released, the riser 35 then lowers the bottle to original work table position and the arms 55 advance the bottle toward the discharge conveyor.

It will be noted that all of the operations herein described take place in a predetermined, timed manner, the timing being established by the control head and its cams.

It is also to be noted that by preheating the thermoplastic material on the seals, the seal is cooling during the formation of the cap around the neck of the bottle so that as soon as pressure is applied bonding action takes place. In the past, some attempts have been made to apply heat and pressure simultaneously to a folded cap around the neck of a bottle, but these prior attempts have not proven successful because some time needs to transpire before heat penetrates the cap and brings the thermoplastic material up to a sticky or adhesive condition. Secondly, pressure was applied while the temperature of the thermoplastic material was increasing. Thermoplastic materials become substantially liquid at high temperatures, and in order to speed operations, the heat input is generally sufficient to liquefy the thermoplastic material so that an appreciable length of time must elapse before the pressure is released, as otherwise the semi-liquid thermoplastic will not hold the cap in position. In other words, previous attempts brought the thermoplastic material into alleged bonding contact while the temperature of the thermoplastic was increasing, whereas in the instant case pressure is applied while the temperature of the thermoplastic is decreasing. As a result, the present mode of operation permits the accomplishment of thorough bonding instantaneously and the capacity of the machines is enormously increased. As a matter of fact, a single chuck machine of the character described herein has the same capacity as many prior machines employing as many as sixteen heads or chucks.

The construction and operation of machines embodying the present invention should be readily apparent to those skilled in the art from the description given hereinabove.

Any bendable or foldable material provided with a lower surface coated, in part at least, with a heat-sensitive or heat-activated thermoplastic substance may be employed for the caps or seals. Metal coated papers whose lower or inner surfaces are coated with thermoplastic such as vinyl or acrylic resin or resinous compounds, are particularly suited for use as a decorative seal on beverage and wine bottles, such seal displacing the metal foil often used. Proper design of the precut hood, seal or cap will assure thorough bonding of the folded portions of the cap and cause the cap to firmly fit around the container adjacent its mouth or opening. Moreover, proper design of such cap or seal will eliminate the adhesion of the hood or seal to the container itself. Many beverage bottles, after having been used by the consumer, are returned to the manufacturer of the beverage and heretofore difficulty has been experienced in removing traces and adherent parts of foil used around the mouth of the bottles. Such difficulties are not encountered by the use of the method and apparatus of this invention.

Although in the exemplary form of apparatus here described in detail, stations A, B and C are arranged along an arcuate path, those skilled in the art will readily conceive that such stations can be arranged along a straight line of travel, the timing mechanism for the operation of the seal feeder, seal heater and sealing head being connected to the bottle or container feeder so that by a series of intermittent steps a container is properly sealed. Whether an arcuate arrangement of stations or a straight line arrangement is employed will depend somewhat upon plant facilities and the size and nature of the container which is being sealed. In all instances, however, the control deck and preheating and seal applying or folding means, such as the chuck, are stationary whereas the containers are caused to travel intermittently along the top of a work table beneath the control deck which carries the seal supplying, seal preheating and seal folding devices. It is to be noted that these various devices may be raised or lowered simultaneously along the vertical support so that suitable adjustment may be readily made to compensate for containers of different sizes or heights. All changes and modifications coming within the scope of the appended claims are embraced thereby.

I claim:

1. In a machine for applying decorative seals over container openings, the combination of: a vertical stationary support; a control deck carried by the support; a work table provided with means for advancing containers thereover in a fixed horizontal plane beneath said control deck; means for holding a supply of unformed, flat seals; a vertically reciprocable heater and a chuck means for folding the preheated seal over the opening of a container, carried in horizontally spaced relation by said control deck; a work turret between the control deck and work table; means for feeding individual seals from said supply into position upon the work turret and above the level of tops of containers on the work table; means for reciprocating said heater into contact with the seal to preheat the same, and means carried by said control deck for operating the chuck; a single continuously driven cam holder for actuating said seal feeding means, heater reciprocating means and chuck actuating means in timed relation to the means for advancing containers over the work table; and means for vertically and simultaneously adjustably positioning said control deck and means carried thereby and the cam holder with respect to said work table and container advancing means.

2. A machine of the character defined in claim 1 including: a container feeding means adapted to feed single containers to the machine, said container feeding means including a reciprocating transfer arm, and means for driving the transfer arm comprising a slotted lever and a continuously driven crank arm cooperating with the slot in said lever whereby the transfer arm is moved in a feeding direction for a longer proportion of a cycle than in the return direction; and a single power means for continuously driving the cam holder, intermittently driving the means for advancing containers over the work table, and continuously driving the crank arm of said container feeding means to obtain operation of all of the elements in precise timed relation.

3. In a machine for applying decorative seals over container openings: means for holding a supply of unformed flat seals; a movable work turret; means for feeding individual seals from said supply into position upon the work turret; a vertically reciprocable heater above the work turret for preheating selected and localized areas of a seal carried by the work turret; chuck means for folding a preheated seal over the opening of a container; a single control head provided with a plurality of control cams for actuating said seal feeding means, heater and chuck means in timed relation to the movement of containers past said means; and container moving means for intermittently advancing containers, in a fixed horizontal plane, past said seal feeding means, heater means and chuck.

4. In a machine for applying decorative seals over container openings: a holder for a stack of precut seals; a movable work turret; means for feeding seals individually from said holder into predetermined position upon the work turret and above the level of tops of containers moving through said machine; a vertically reciprocable heater including a plurality of heat-directing bosses for preheating selected and localized areas of a seal above the work turret; chuck means above the work turret for folding a preheated seal over the opening of a container; a single control head provided with a plurality of control cams for actuating said seal feeding means, work turret, heater and chuck means in timed relation to the movement of containers past said means; and container moving means for intermittently advancing containers, in a fixed horizontal plane, past said seal feeding means, heater means and chuck.

5. In a machine for applying decorative seals over container openings: means for holding a supply of unformed flat seals; a movable work turret; means for feeding individual seals from said supply into predetermined position upon the work turret and above the level of containers moving through said machine; a vertically reciprocable heater for preheating selected and localized areas of a seal while the latter is carried by the work turret; chuck means for folding a preheated seal over the opening of a container, said chuck including a contact plunger, crimping fingers actuated by movement of the contact plunger, and pressure pads pivotally carried by the chuck for pressing a seal around the container; a single control head provided with a plurality of control cams for actuating said seal feeding means, work turret, heater and chuck means in timed relation to the movement of containers past said means; and container moving means for intermittently advancing containers, in a fixed horizontal plane, past said seal feeding means, heater means and chuck and below the work turret.

6. In a machine for applying decorative seals over container openings: means for holding a supply of unformed flat seals; a work turret; means for feeding individual seals from said supply into predetermined position on the work turret and above the level of containers advancing through said machine; a vertically reciprocable heater for preheating selected and localized areas of a seal while the latter is on the work turret; chuck means for folding a preheated seal over the opening of a container, said seal supply, heater and chuck means being circularly arranged around a centrally disposed control head, said control head including a continuously driven vertical center shaft, a stationary sleeve therearound and an upper, continuously driven outer cam holder carrying a plurality of cams for actuating said seal feeding means, heater and chuck means; container moving means for intermittently advancing containers, in a fixed horizontal plane, past said seal feeding means, heater means and chuck; and means for vertically and simultaneously adjustably positioning said seal supply, seal feeding means, heater and chuck means and said outer cam holder with respect to the container moving means.

7. In an apparatus for applying seals over the openings of containers, the combination of: a base provided with a work table, a gear case carried by the base, a vertical stationary hollow column extending from the gear case, a continuously driven shaft within said column, a cam holder keyed to the upper end of the shaft for rotation therewith, said cam holder being vertically movable along the shaft, means for advancing containers over said work table and around the column, means within the gear case for continuously driving the vertical shaft and intermittently actuating the container advancing means, a control deck carried by said column, means for raising and lowering said control deck and cam holder simultaneously, and means carried by the control deck for preheating container seals and for folding the same around the openings of containers on the work table.

8. An apparatus of the character defined in claim 7 wherein the seal preheating means and seal folding means are actuated by the cam holder.

9. In a machine for applying decorative seals over container openings, the combination of: a vertical stationary support, a control deck carried by the support, a work table provided with means for advancing containers thereover in a fixed horizontal plane beneath said control deck, a work turret between said control deck and work table; means for holding a supply of unformed flat seals, a vertically reciprocable heater and a chuck means for folding a preheated seal over the opening of a container, carried in horizontally spaced relation by said control deck; means for feeding individual seals from said supply into predetermined position onto the work turret to support the seal, means for intermittently advancing the work turret and seal carried thereby, means for reciprocating said heater into contact with the seal to preheat the same, and means for actuating the chuck, said actuating and reciprocating means being carried by the control deck; and a continuously driven cam holder for actuating said seal feeding means, heater reciprocating means and chuck actuating means in timed relation to the means for advancing containers over the work table.

10. In a machine of the character defined in claim 1, means for intermittently driving the means for advancing containers over the work table and for continuously driving the cam holder, said cam holder driving means extending through the vertical stationary suport.

11. In a machine of the character defined in claim 9, means for intermittently driving the means for advancing containers over the work table and for continuously driving the cam holder, said cam holder driving means extending through the vertical stationary support.

12. A machine of the character defined in claim 1 including a container feeding means adapted to feed single containers to the machine, said container feeding means including a reciprocating transfer arm and means for driving the transfer arm comprising a slotted lever, and a continuously driven crank arm cooperating with the slot in said lever whereby the transfer arm is moved in a feeding direction for a longer proportion of a cycle than in the return direction; a driving shaft extending through a vertical stationary support whereby the cam holder may be driven; and a motor means for continuously driving the drive shaft, intermittently driving the means for advancing containers over the work table, and continuously driving the crank arm of said container feeding means to obtain operation of all of the elements in precise timed relation.

13. A machine of the character defined in claim 9 including a container feeding means adapted to feed single containers to the machine, said container feeding means including a reciprocating transfer arm and means for driving the transfer arm comprising a slotted lever, and a continuously driven crank arm cooperating with the slot in said lever whereby the transfer arm is moved in a feeding direction for a longer proportion of a cycle than in the return direction; a drive shaft extending through a vertical stationary support whereby the cam holder may be driven; and a motor means for continuously driving the drive shaft, intermittently driving the means for advancing containers over the work table, intermittently driving the work turret, and continuously driving the crank arm of said container feeding means to obtain operation of all of the elements in precise timed relation.

14. A machine of the character defined in claim 1 including: means for moving the work turret and individual seals carried thereby in timed relation to the means for advancing containers.

15. In a machine for applying decorative and protective seals over container openings: means for intermittently advancing containers; means for supplying containers to the advancing means; a work turret movable in a plane above the level of tops of containers supplied to the advancing means; a holder for a stack of flat, precut seals; means for feeding seals individually from the holder onto the work turret; a vertically reciprocatable heater above the work turret for preheating selected areas of a seal on the work turret to render said areas thermoplastic and means for folding the preheated seals over and around the opening of a container, said work turret moving said seals successively into operating relation with the heater and folding means.

DON RAY.